Feb. 9, 1960 R. C. GROVES 2,924,206
FUEL INJECTION SYSTEM
Filed July 12, 1956 6 Sheets-Sheet 1

INVENTOR.
Ronald C. Groves
BY
L. D. Burek
ATTORNEY.

Feb. 9, 1960 R. C. GROVES 2,924,206
FUEL INJECTION SYSTEM
Filed July 12, 1956 6 Sheets-Sheet 4

INVENTOR
Ronald C. Groves
BY
L. D. Burch
ATTORNEY

Feb. 9, 1960    R. C. GROVES    2,924,206
FUEL INJECTION SYSTEM
Filed July 12, 1956    6 Sheets-Sheet 5

INVENTOR.
Ronald C. Groves
BY
L. D. Burch
ATTORNEY.

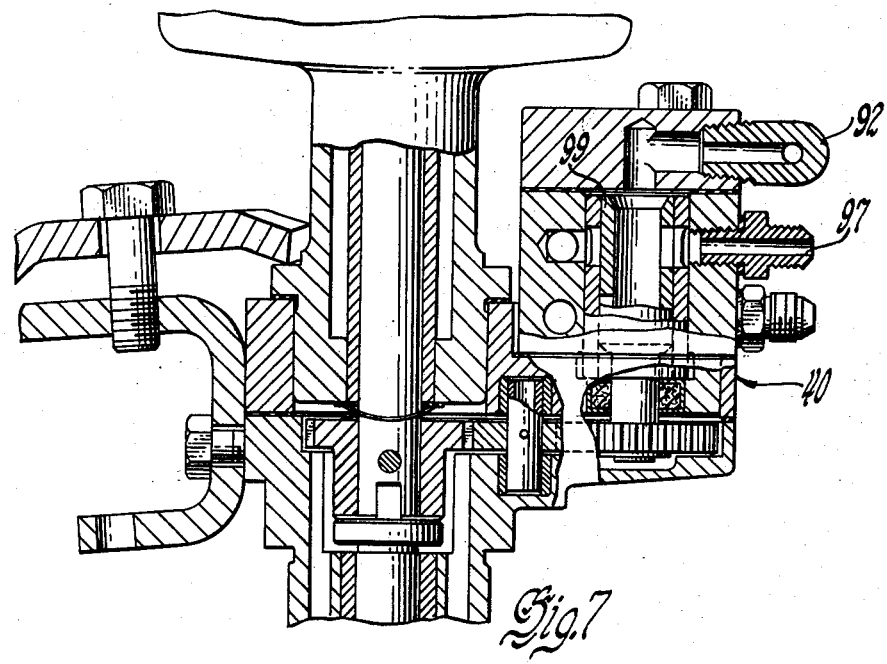
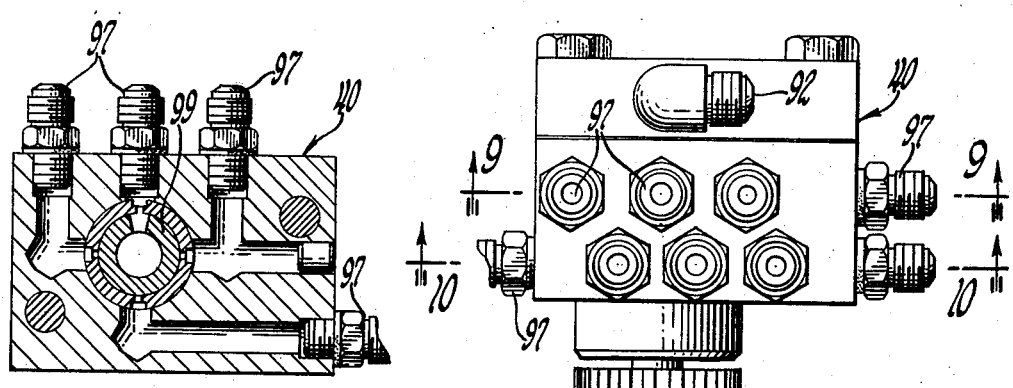
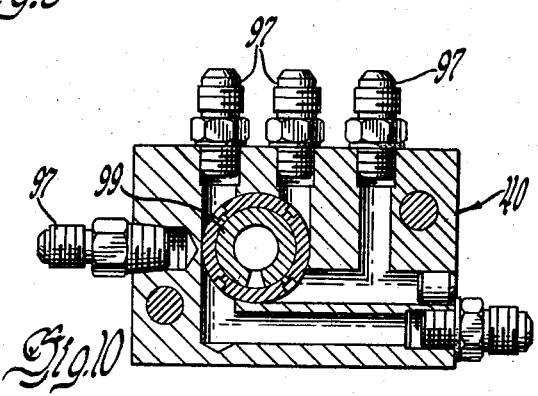

United States Patent Office 2,924,206
Patented Feb. 9, 1960

2,924,206
FUEL INJECTION SYSTEM

Ronald C. Groves, Grandville, Mich., assignor to General Motors Corporation, Detroit, Mich., a corporation of Delaware Application July 12, 1956, Serial No. 597,457

13 Claims. (Cl. 123—119)

The present invention relates to internal combustion engines and more particularly to a fuel injection system adapted to inject metered quantities of fuel into the charge for the cylinders of such an engine.

In a so-called spark ignited, internal combustion engine, a combustible charge of air and fuel is formed and then compressed in the engine cylinders where it is ignited by a spark. Although it has been the general practice to employ one or more carburetors and an intake manifold for forming and distributing the combustible charge to the various cylinders, such an arrangement has many inherent limitations. Accordingly, a considerable amount of work has been done in an effort to develop a satisfactory fuel injection system which will permit metered quantities of fuel to be injected into the combustible charge either ahead of the intake valve or directly into the combustion chamber. However, so far, an economical fuel injection system suitable for use on a mass produced automotive vehicle has not been developed. The previous systems have been unable to accurately meter the fuel over the entire operating range of the engine, they have been prohibitively expensive and/or they have been excessively troublesome in operation.

One of the more satisfactory methods for metering the fuel in the previous injection systems has been balancing a signal indicative of the mass of air flowing into the engine against a signal indicative of the amount of fuel flowing into the engine. By maintaining these signals in the desired proportions the ar and fuel in the resultant charge will be maintained in the desired proportions. The signal indicative of the air flow has usually been obtained from a venturi disposed in the intake to the induction system. Unfortunately, such a venturi presents an obstruction to the flow of air into the engine and, consequently, will tend to materially limit volumetric efficiency of the induction system and therefore the maximum power available from the engine.

It is now proposed to provide a fuel injection system which will be responsive to the mass of air flowing through the engine but will not present any flow restricting metering devices in the induction system. This is to be accomplished by sensing the amount of exhaust gases discharged from the engine by means responsive to the amount of exhaust back pressure. Since the exhaust system is the equivalent of a metering restriction, the exhaust back pressure will be indicative of the mass of air flowing through the exhaust system and thus through the engine. The pressure of gases in the exhaust system is applied to a pressure responsive device which is interconnected with a second pressure responsive device which has applied thereto a pressure signal indicative of the volume of the fuel flow. These responsive devices are interconnected with a fuel metering valve so as to adjust the fuel flow and maintain these two signals in some predetermined relation.

Although the air-fuel ratio will normally remain substantially constant, during certain engine operating conditions it may be desirable to change the air-fuel ratio. It is therefore proposed to provide means responsive to the various operating conditions of the engine to modify the action of the metering means to thereby change the air-fuel ratio.

It has been found that although the exhaust back pressure is an index of the volume of air flowing through the engine, any changes in the air flow must have passed through the engine before the change will be reflected in the exhaust system. As a result there may be a time delay between the time the air flow in the induction system changes and the time the pressure in the exhaust system reflects the change. It is therefore proposed to provide means to supplement the exhaust back pressure responsive means to instantly sense any changes in the air flow in the induction system and thereby prevent any objectionable variations in the air-fuel ratio during a transient change. This is to be accomplished by employing enrichment means responsive to the induction vacuum.

In the six sheets of drawings:

Figure 7 is a longitudinal cross sectional view of the fuel distributor mounted on the electrical ignition distributor.

Figure 8 is a side view of the fuel distributor.

Figure 9 is a cross sectional view of the fuel distributor taken substantially along the plane of line 9—9 in Figure 8.

Figure 10 is a cross sectional view of the fuel distributor taken substantially along the plane of line 10—10 in Figure 8.

Figure 1:
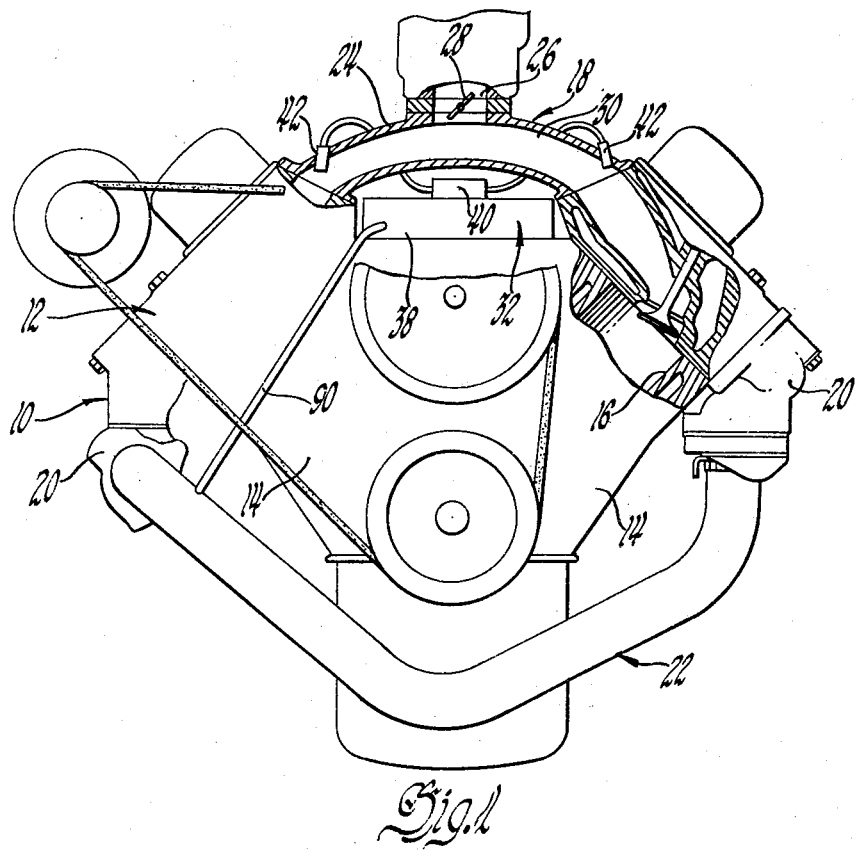
Figure 1 is an end view with parts thereof broken away of an engine embodying the present invention.

Referring to the drawings in more detail the present invention may be adapted for use on any suitable internal combustion engine 10. The present engine 10 is of the so-called spark ignited type and has a cylinder block 12 with a pair of angularly disposed banks 14 of cylinders 16 with a space therebetween. An induction system 18 may be disposed above this space between the two banks 14 of cylinders 16 for supplying the charge to the cylinders 16. In addition, a pair of exhaust manifolds 20 may be secured along the opposite sides of the engine 10 to collect the exhaust gases as they are discharged from the cylinders 16 and to direct them into an exhaust system 22 for dissipation into the atmosphere.

The induction system 18 includes an intake manifold 24 having an inlet 26 with a throttle valve 28 therein to regulate the volume of the charge flowing into the cylinders 16. It may be seen that although an air cleaner and/or silencer assembly may be employed on the inlet 26, the inlet is free of any flow limiting metering restrictions such as a venturi. The intake manifold 24 may also include a plurality of branch passages 30 that communicate with the engine cylinders 16 for supplying the charge directly to the cylinders 16.

In order to form the combustible charge of the cylinders 16, metered quantities of fuel may be injected into the air in the induction system 18 by a fuel injection system 32. The present system 32 includes a supply tank 34 containing the combustible fuel, a fuel pump 36, a fuel metering structure 38, a fuel distributor 40 and injector nozzles 42.

The fuel pump 36 may be of any suitable variety which is capable of delivering fuel to the fuel metering structure in excess of the engine requirements and under adequate pressure to actuate all of the components of the system 32. Although this pump 36 may be driven by an electrical motor or other suitable means, it has been found advantageous to drive the pump from the engine 10. A spring biased pressure relief valve 44 may be interconnected with a fuel supply line 46 from the pump outlet for regulating the pressure of the fuel contained in the fuel injection system 32. The relief valve 44 will spill the surplus fuel into the spill fuel line 48 for return to the storage tank 34.

The fuel metering structure 38 includes a unit 50 that is responsive to both the fuel flow and the air flow. The present unit 50 includes a housing having a pressure responsive fuel diaphragm 52 and a pressure responsive air diaphragm 54 which together with the seal diaphragms 56 divide the housing up into a plurality of separate diaphragm chambers 58, 60, 62 and 64 that are isolated from each other. All of these diaphragms 52, 54 and 56 are interconnected with each other by a rigid shaft 66 that extends longitudinally of the housing and has one end 68 thereof connected directly to a metering valve 70 or to the plungers 72 in a servo valve 74. The servo valve 74 includes a housing having a pair of ports 76 and 78 that are connected to the chambers 80 and 82 on the opposite sides of the piston 84 by a rich line 86 and a lean line 88. When the plungers 72 cover the ports 76 and 78 the piston 84 will be locked in a fixed position. However, in the event the plungers 72 uncover the ports 76 and 78 fuel will flow from the fuel supply line to one side of the piston 84 and open or close the metering valve 70. The exhaust fuel from the servo valve will be returned to the fuel tank 34 by the spill fuel line 48. It will thus be seen that the cumulative effects of all of the pressures on the diaphragms 52, 54 and 56 will be effective to regulate the position of the metering valve 70 and thereby the amount of metered fuel flowing therethrough and into the engine 10.

Figure 2:
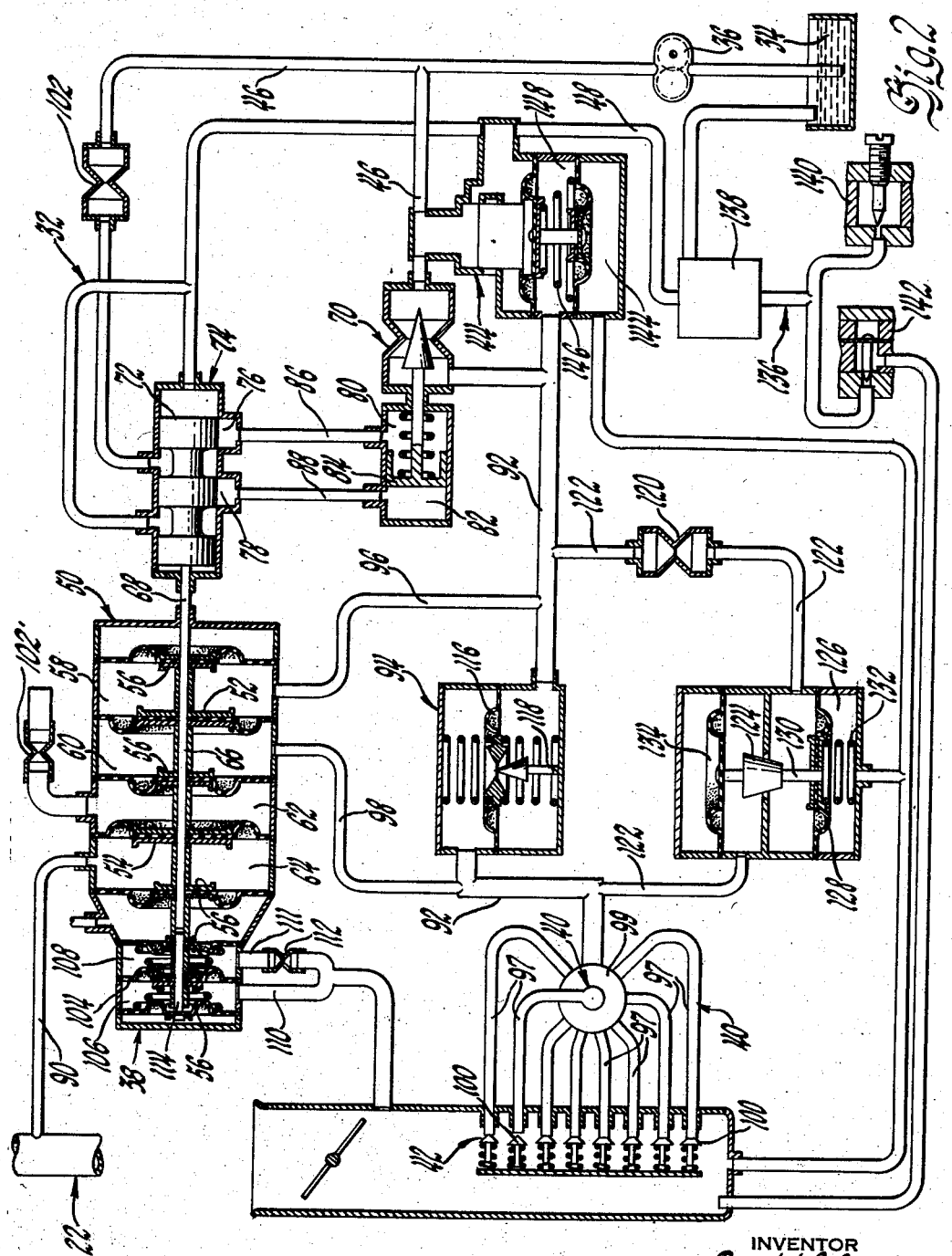
Figure 2 is a diagrammatic view of the fuel injection system employed on the engine of Figure 1.
Figure 3:
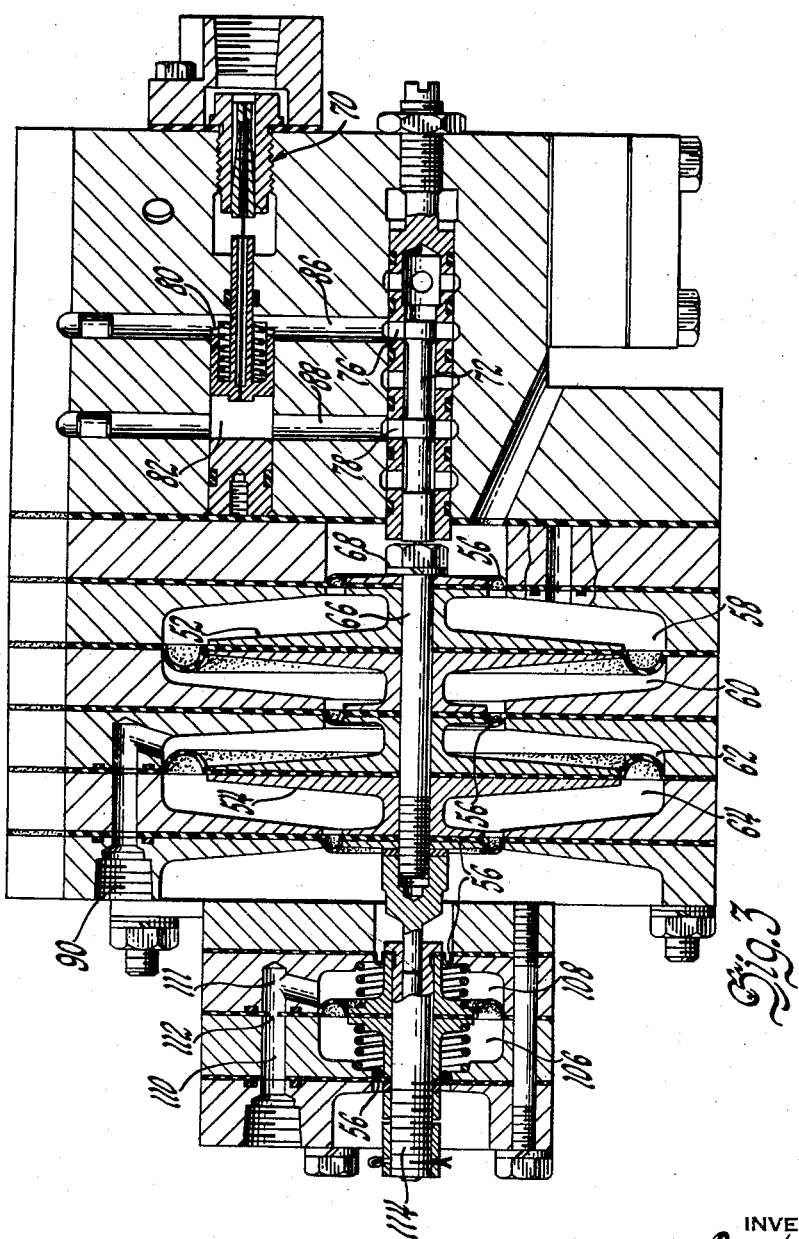
Figure 3 is a cross sectional view of the diaphragm unit employed in this system.
Figure 4:
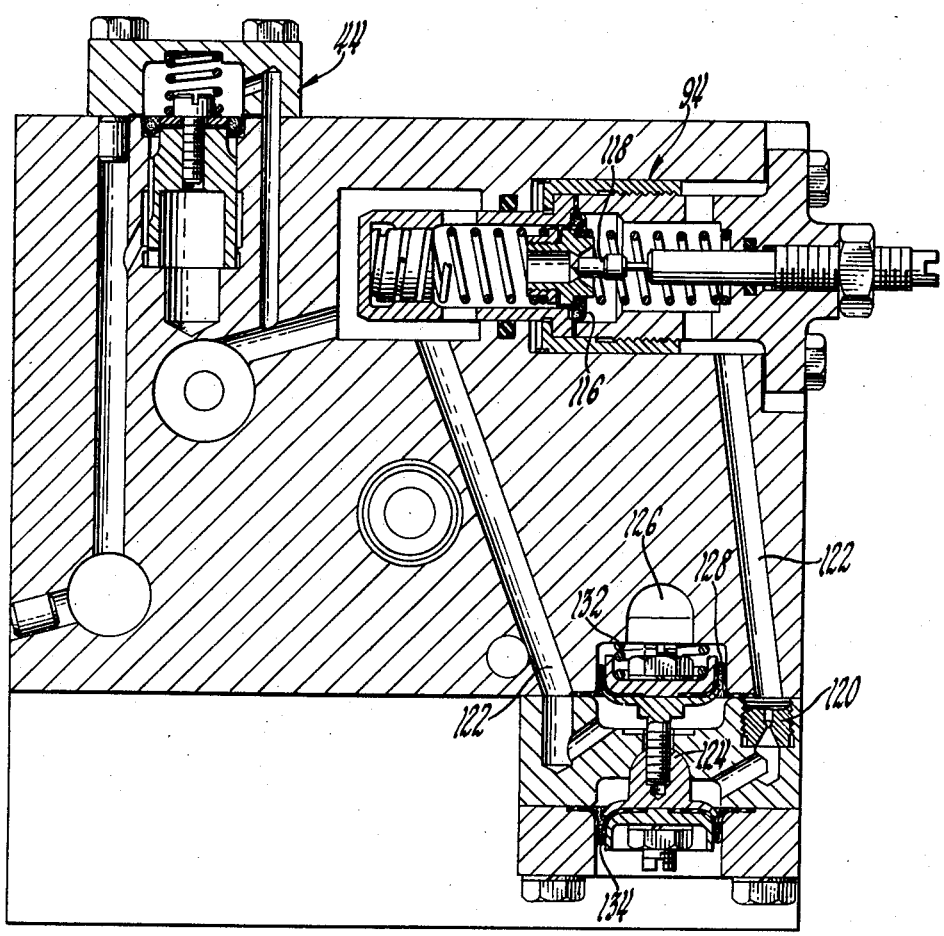
Figure 4 is a cross sectional view of the housing for the metering orifices.
Figure 5:
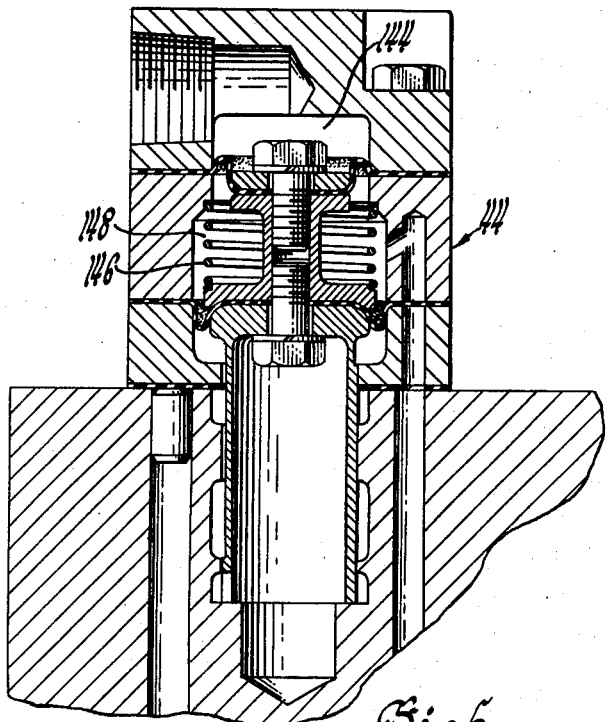
Figure 5 is an enlarged fragmentary cross sectional view of the pressure relief valve.
Figure 6:
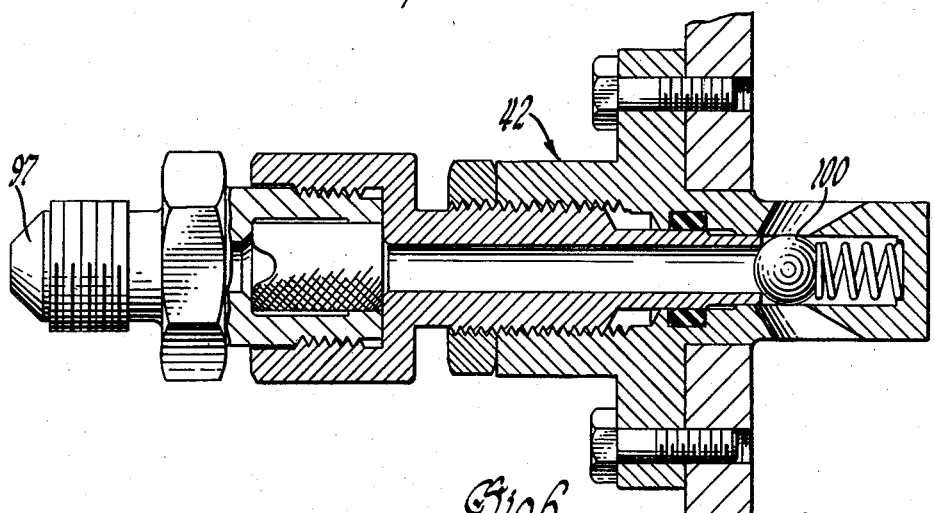
Figure 6 is a cross sectional view of an injector nozzle.

In order to sense the quantity of air flowing through the induction system and consequently consumed by the engine, an air signal tube 90 may interconnect the diaphragm chamber 64 with the exhaust system 22. Thus as the exhaust gases flow in the exhaust system 22 and produce a pressure therein, the exhaust gases may flow into or out of the diaphragm chamber 64 and produce a force on the air diaphragm 54. It should be noted that the exhaust system 22 will present an obstruction to the flow of exhaust gases therethrough and therefore the exhaust back pressure will be indicative of the mass of the exhaust gases passing therethrough. Since the chamber 62 on the opposite side of the diaphragm 64 is vented to atmosphere the resultant force on the air diaphragm 64 will be indicative of the mass of exhaust gases passing through the exhaust system and will tend to move the shaft 66 to the right (Figure 2).

In order to sense the quantity of fuel flowing through the fuel line 92 and being consumed in the engine, a restriction such as an orifice 94 may be provided in the fuel line 92. As the fuel passes through this restriction it will produce a pressure differential thereacross indicative of the fuel flow. A tube 96 may be provided for interconnecting the fuel line immediately anterior to the fuel orifice 94 with the chamber 58 on one side of the fuel diaphragm 52 while another tube 98 interconnects the chamber 60 on the opposite side of the fuel diaphragm 52 with the fuel line 92 immediately posterior to the fuel orifice 94. It will thus be seen that as the fuel flows along the fuel line 92 and through the fuel orifice 94, it will develop a pressure differential that will produce a force on the fuel diaphragm 52 proportional to the fuel flow and tending to move the shaft 66 to the left (Figure 2).

When the fuel and air pressures are disposed on the correct sides of the diaphragms 52 and 54, the resultant forces will oppose each other. As a result, when the air and fuel are flowing in some predetermined ratio, these two forces will be equal and there will be no axial force tending to move the shaft 66 in either direction. If the fuel flow is in excess of this amount or in other words the fuel flow would produce a charge that was excessively rich, the force on the fuel diaphragm 52 will exceed the force on the air diapragm 54. As a result the shaft 66 will move the plungers 72 and uncover port 78 to allow the fuel to flow through the leaner line 88 and move the piston 84 to close the metering valve 70 until the air and fuel are again flowing in the desired proportions. Conversely, if the fuel flow is too small, the force on the air diaphragm 54 will exceed the force on the fuel diaphragm 52 and the plungers 72 uncover the port 76 to allow the fuel to flow through the richer line 86 and move the valve 70 further open until the air and fuel are flowing in the desired proportions. It will thus be seen that the metering structure 38 will sense the ratio between the fuel flow and the air flow and adjust the metering valve 70 to preserve the desired air-fuel ratio.

After the metered fuel has passed through the metering orifice 94, it will flow through the fuel line 92 and a suitable fuel distributor 40 where it will be divided into equal portions and distributed to the various injector nozzles 42 by the injector lines 97. This distributor 40 may be of any suitable type; however, in the present instance the distributor 40 includes a rotor 99 driven at camshaft speed. Thus the fuel will be distributed to the cylinders 16 in intermittent intervals timed to the operation of the cylinders 16. Preferably, the fuel is injected for a particular cylinder 16 only during that period when the associated intake valve is open.

In addition to the distributor 40, it has also been found desirable to employ injector nozzles 42 that include pressure check valves 100. This will not only insure a sharp starting and stopping of the injection period but it will also tend to isolate the fuel in the injection system from the effects of intake vacuum and to maintain the fuel pressure in the system 32 sufficiently high to prevent the formation of any fuel vapors in the system.

From the foregoing it may thus be seen that in the event the throttle valve 28 in the induction inlet 26 is opened or closed, the mass of the air passing through the engine 10 will change. There will also be a corresponding change in the mass of exhaust gases flowing through the exhaust system 22 which, in turn, will be reflected in a change in the pressure of the exhaust gases in the exhaust system. The resultant change in the exhaust back pressure will cause the exhaust gases to flow through the tube 90 and alter the gas pressure in the diaphragm chamber 64 and produce an unbalanced condition between the forces on the diaphragms 52 and 54. Consequently, the shaft 66 will actuate the servo valve 74 and produce an adjustment in the fuel metering valve 70 that will maintain the desired air-fuel ratio. If necessary, restrictions 102 and 102' may be disposed in the fuel supply line 46 and the inlet to the diaphragm chamber 62 to slow the movement of the piston 84 and reduce hunting.

In a fuel injection system which is primarily controlled by the exhaust back pressure, there is an inherent lag between the increase of the air flow through the induction system 18 and the exhaust system 22. Thus if the metering structure is solely responsive to the exhaust back pressure, the system 32 will not be able to modify the fuel flow until the change in air flow has reached the exhaust system 22. Consequently, there might be a transient condition during which the air and fuel ratio would fall outside of the desirable limits. To eliminate this possibility an acceleration diaphragm 104 may be provided which has air chambers 106 and 108 on the opposite sides thereof. One of these chambers 106 is connected directly to the intake manifold 24 by substantially unrestricted passage 110. The chamber 108 on the opposite side of the diaphragm 104 is also connected to the intake manifold 24 by a passage 111. However, there is a limiting restriction 112 in this passage 111 that is effective to retard the rate at which air may flow into and out of the chamber 108. During normal operation the intake vacuum will remain substantially constant so that the pressures in the two chambers 106 and 108 will be equal and there will be no force on the diaphragm 104 which will tend to move it in either direction. In the event the throttle valve 28 is opened and the air flow to the engine 10 increases, the intake vacuum will decrease. Since the diaphragm chamber 106 is connected to the intake manifold by an unrestricted passage 110, the air pressure in this chamber will closely follow the intake manifold vacuum. However, the vacuum in the other chamber 108 will be prevented from rapidly dissipating due to the restriction 112 in the passage 111. Thus it will be seen that a decrease in the intake vacuum will produce an unbalance in the chambers 106 and 108 which will tend to move the diaphragm 104 and its shaft 114 to the right so as to engage the end of the shaft 66 and initiate movement of the plungers 72 in the servo valve 74 so as to open the metering valve 70 and increase the rate of fuel flow. Thus the acceleration diaphragm 104 will increase the fuel flow instantly with an increase in the air flow until the change in the air flow appears in the exhaust system 22 and the normal metering action is restored. By proper proportioning of the diaphragm 104, chambers 106 and 108 and the restriction 112, this action may be adapted to maintain a substantially constant air-fuel ratio or to act as an accelerator pump and increase the richness of the charge for more power during acceleration. Upon closing the throttle valve 28 and increasing the intake vacuum, the resultant force on the shaft 114 will separate the two shafts 66 and 114 and prevent the leaning out of the charge which might otherwise occur if the two shafts were rigidly connected together.

An internal combustion engine such as employed in an automotive vehicle normally operates a large majority of the time at some fraction of its maximum load capacity, i.e., so-called road load, and only occasionally at full power. Therefore, it is desirable to provide a lean mixture during road load operation to insure economical operation. Accordingly, the resistance of the orifice 94 should be adapted to produce a pressure drop suitable for a charge having an air-fuel ratio adapted for maximum economy. This ratio will normally be substantially constant over the entire operating range of the engine. However, in some engines there may be a slight variation in this ratio. In addition, there may be a few minor inaccuracies such as flow losses around the orifice and in the exhaust system which will cause a slight change in the relationship between the pressure differentials and the mass of the flows. Accordingly, it is desirable that the metering orifice 94 have a variable area to compensate for such factors. In the present instance this orifice 94 is formed in a spring biased diaphragm 116 which is free to move as a function of the pressure drop thereacross. A stationary needle 118 projects into this orifice 94 and determines the effective area thereof as the diaphragm 116 moves relative thereto in response to the fuel flow. By providing the proper taper on the needle 118 and spring rates, the fuel flow can be matched to the fuel requirements of the engine.

Although the engine normally operates at only part load during which maximum economy is of primary importance there may be occasions during which maximum torque and/or power are of paramount concern and economy of secondary importance. Since such operation requires a considerably richer mixture, a maximum power or secondary orifice 120 may be disposed in parallel to said primary orifice 94. The secondary orifice 120 is disposed in a secondary fuel line 122 having a pressure actuated valve 124 therein. The valve 124 is in a housing having a diaphragm chamber 126 in the bottom thereof which is connected to the intake vacuum. The diaphragm 128 is connected to the shaft 130 and is spring biased to move valve 124 toward the open position. However, the intake vacuum will normally retain the valve 124 closed. When the throttle valve 28 is opened for maximum power, the intake vacuum will be very small and as a result the spring 132 will force the valve 124 into the open position. The metered fuel will then divide and flow through both the primary and the secondary orifices 94 and 120. This will, in turn, cause an increase in the fuel flow and a richer charge. A second diaphragm 134 may be disposed on the opposite side of the valve 124 to balance the effect of fuel pressure on the first diaphragm 128.

It has been found that an internal combustion engine 10 which idles at a low speed must have a mixture of slightly richer proportions than is required during normal operation. Accordingly, an idle circuit 136 is provided that supplies the fuel during idling. This circuit 136 includes a tank 138 fed from the spill fuel line 48 and a pair of parallel orifices 140 and 142. The first orifice 140 is an adjustable needle valve and determines the normal idle air-fuel mixture. A thermostat responsive to the engine temperature regulates the area of the second orifice for controlling a supply of enrichment fuel for cold starts and periods when the engine is operating at subnormal temperatures. When the engine is idling the high intake vacuum will cause the fuel flow through one or more of the idle nozzles disposed around the induction system. As the speed of the engine increases the induction vacuum will decrease and there will be a negligible fuel flow through the idle circuit.

As previously stated a pressure relief valve 44 may be disposed in the fuel supply line 46 so as to maintain a predetermined pressure in the fuel system and to by-pass the surplus fuel through the spill fuel line 48 for return to the storage tank 34. Since the injector nozzles 42 are disposed in the intake manifold their opening will be opposed by the air pressure or vacuum therein. Consequently, the gauge pressure of the fuel in the injector lines 97 which is required to open the nozzles 42 will be dependent upon the vacuum in the intake manifold 24. Since this vacuum will vary over a very wide range during normal operation of the engine 10, it has been found desirable to provide a diaphragm chamber 144 in the pressure relief valve 44 which will interact with the spring 146 to maintain the fuel pressure in the system at some predetermined amount above the vacuum in the intake manifold 24. Thus irrespective of any changes in the intake manifold vacuum, the pressure in the fuel system will always be maintained at the optimum amount for causing proper operation of the injector nozzles 42. A second diaphragm chamber 148 may also be employed which is interconnected with the fuel line 92 so that the pressure of the fuel in the line will assist the spring 146 and maintain the pressure in the fuel supply line 46 some predetermined amount above the pressure in the fuel line 92.

I claim:

1. In an internal combustion engine having a plurality of cylinders with an induction system for charging said cylinders and an exhaust system for collecting the gases from said cylinders, a fuel injection system comprising a pump having an outlet for discharging fuel under pressure, a metering valve connected to said pump outlet for metering the fuel flow therethrough, a metering restriction connected to said valve through which the metered fuel flows, distributing means for distributing equal increments of said metered fuel to said cylinders, means responsive to to pressure in said exhaust system and to the pressure drop across said restriction and effective to actuate said metering valve for maintaining said pressures in some predetermined proportions, means responsive to the load on said engine for varying the resistance of said restriction in proportion thereto for regulating the ratio of air and fuel in proportion to said load.

2. A fuel injection system for injecting metered quantities of fuel into the charges for the cylinders of an internal combustion engine comprising means responsive to the amount of fuel flowing through said injection system and injected into the charges for said cylinders, means responsive to the amount of exhaust gases flowing from said engine, metering means actuated by said foregoing means for maintaining said fuel flow and the air flow through said induction system in some predetermined proportions, and means responsive to the load on said engine for modifying the action of said metering means to change said proportions as a function of said load.

3. In an internal combustion engine having a plurality of cylinders with an induction system for charging said cylinders and an exhaust system for collecting the exhaust gases from said cylinders and dissipating them in the atmosphere, a fuel injection system comprising a fuel pump discharging fuel therefrom under pressure, a fuel line connecting said pump to distributing means for distributing equal increments of fuel to the charges for said cylinders, a metering valve disposed in said fuel line for regulating the fuel flow therethrough, an orifice disposed in said fuel line through which said fuel flows, said orifice having a variable area in response to the pressure differential thereacross, means responsive to the pressure differential across said orifice and to the pressure in said exhaust system for actuating said metering valve for maintaining said pressure differential and the pressure of the gases in said exhaust system in some predetermined proportions.

4. In an internal combustion engine having a plurality of cylinders with an induction system for charging said cylinders and an exhaust system for collecting the exhaust gases from said cylinders and dissipating them into the atmosphere, a fuel injection system for injecting metered quantities of fuel into the charges for said cylinders, said injection system comprising a first pressure responsive means adapted to sense a pressure proportional to the volume of fuel flowing through said injection system and injected into said charges, second pressure responsive means adapted to sense the flow of exhaust gases through said exhaust system, fuel control means operatively interconnected with said pressure responsive means to balance said pressures and maintain said fuel and exhaust flows in some predetermined proportions, means responsive to the vacuum in said induction system for modifying the action of said fuel control means for increasing the proportion of fuel flow whenever said vacuum is less than some predetermined amount.

5. In an internal combustion engine having a plurality of cylinders with an induction system for charging said cylinders and an exhaust system for collecting the exhaust gases from said cylinders and dissipating them into the atmosphere, a fuel injection system comprising a source of fuel under pressure, a fuel line connecting said source with distributing means for distributing equal increments of fuel to the charges for said cylinders, a fuel metering valve disposed in said fuel line for metering the fuel flowing therethrough, a metering restriction in said fuel line, means responsive to the pressure in said exhaust system and to the pressure drop across said restriction and being effective to actuate said metering valve for maintaining said pressures in some predetermined proportions, said restriction including a primary orifice and a normally closed secondary orifice disposed in parallel to said primary orifice, means for opening said secondary orifice whenever the load on said engine exceeds some predetermined amount.

6. In an internal combustion engine having a plurality of cylinders, an induction system for charging said cylinders with a combustible charge of air and fuel, an exhaust system for collecting the exhaust gases from said cylinders and dissipating them into the atmosphere, a source of fuel under pressure, a fuel line connecting said source with distributing means for distributing equal increments of fuel to the charges for said cylinders, a fuel metering valve disposed in said fuel line for metering the fuel flowing therethrough, a metering restriction in said fuel line through which said metered fuel flows, means responsive to the flow of exhaust gases in said exhaust system and to the pressure drop across said restriction, said means being effective to actuate said metering valve for maintaining said pressures in some predetermined proportions, said restriction including a primary orifice and, in parallel therewith, a secondary orifice in parallel therewith, a normally closed valve controlling the flow of fuel through said secondary orifice, means responsive to the vacuum in said induction system for opening said valve whenever said vacuum is less than some predetermined amount to thereby increase the proportion of fuel to air in said charge.

7. Metering means for a fuel injection system for an internal combustion engine having an air induction system and an exhaust system, said injection system comprising pressure responsive means adapted to sense the amount of air pressure in the exhaust system, pressure responsive means adapted to sense the amount of fuel flow through said injection system and into an engine, and pressure responsive means adapted to sense the rate of change of the air pressure in said induction system.

8. In an internal combustion engine having a plurality of cylinders with an induction system for charging said cylinders and an exhaust system for collecting the exhaust gases from said cylinders and dissipating them into the atmosphere, a fuel injection system for injecting metered quantities of fuel into the charges for said cylinders, said injection system comprising means responsive to the amount of fuel flowing through said injection system and injected into said charges, means responsive to the flow of exhaust gases through said exhaust system, and means actuated by said foregoing means for maintaining said flows in some predetermined proportions, said last mentioned means being responsive to the rate of change of the pressure of the air in said induction system to increase said fuel flow whenever the pressure of the air in said induction system increases.

9. In an internal combustion engine having a plurality of cylinders, an induction system for charging said cylinders with a combustible mixture of air and fuel and a throttle valve for regulating the volume of said charge, an exhaust system for collecting the exhaust gases from said cylinders and dissipating them into the atmosphere, at least one fuel injection nozzle disposed in said induction system for injecting fuel into said charge, metering means responsive to the amount of said fuel flow and to the amount of said exhaust gas flow and effective to maintain said flows in some predetermined proportions, means responsive to the rate of change of the pressure of the air in said induction system for actuating said metering means to increase said fuel flow whenever the vacuum in said induction system decreases.

10. In a fuel injection system for a multicylinder, internal combustion engine having an induction system for charging the cylinders with a charge of air and fuel and an exhaust system for collecting the exhaust gases from said cylinders and dissipating them into the atmosphere, fuel metering means comprising a metering valve for metering the volume of fuel flowing through said injection system and pressure responsive means operatively interconnected with said valve to actuate said valve and thereby meter the fuel flow, pressure responsive means adapted to sense a pressure signal indicative of said volume of fuel flow and the pressure of the exhaust gases in said exhaust system, said pressure responsive means being connected to said metering valve to actuate said valve and thereby maintain said pressures in some predetermined proportions, said pressure responsive means being adapted to sense the rate of change of the vacuum in said induction system to bias said metering valve in an open direction whenever said vacuum decreases.

11. In a fuel injection system for a multicylinder, internal combustion engine having an induction system for charging said cylinders with a combustible charge of air and fuel and an exhaust system for collecting the exhaust gases from said cylinders and dissipating them into the atmosphere, fuel metering means comprising a metering valve for metering the volume of fuel flowing through said injection system and a diaphragm unit having a first diaphragm responsive to a pressure signal indicative of fuel flow and a second diaphragm responsive to the pressure of the gases in said exhaust system, said diaphragms being operatively interconnected with said metering valve to maintain said pressures in some predetermined proportions, said diaphragm unit also including a third diaphragm responsive to the rate of change of the vacuum in said induction system for biasing said valve in an open direction when said vacuum decreases.

12. In a fuel injection system for a multicylinder, internal combustion engine having an induction system for charging said cylinders with a combustible charge of air and fuel and an exhaust system for collecting the exhaust gases from said cylinders and dissipating them into the atmosphere, fuel metering means comprising a metering valve for metering the volume of fuel flowing through said injection system and a diaphragm unit having a first diaphragm responsive to a pressure signal indicative of fuel flow and a second diaphragm responsive to the pressure in said exhaust system, said diaphragms being operatively interconnected with said metering valve to maintain said pressures in some predetermined proportions, said diaphragm unit also including a third diaphragm forming a pair of diaphragm chambers connected to said induction system by a pair of passages, one of said passages being substantially unrestricted and the other passage having a restriction to retard the flow of gases into and out of one of said chambers so that a decrease in the vacuum in said induction system will bias said valve toward the open position.

13. In an internal combustion engine having a plurality of cylinders with an induction system for charging said cylinders and an exhaust system for exhausting the burned gases from said cylinders, a fuel injection system comprising a pump having an outlet for discharging fuel under pressure, a metering valve connected to said pump outlet for metering the fuel flow therethrough, a differential pressure relief valve connected to said pump outlet responsive to the vacuum in said induction system for maintaining the pressure of the fuel in said induction system some predetermined amount above the air pressure in said induction system, a metering restriction connected to said valve through which the metered fuel flows, distributing means for distributing equal increments of said metered fuel to said cylinders, means responsive to the pressure in said exhaust system and to the pressure drop across said restriction and effective to actuate said metering valve for maintaining said pressures in some predetermined proportions.

References Cited in the file of this patent

UNITED STATES PATENTS

| | | |
|---|---|---|
| 2,281,411 | Campbell | Apr. 28, 1942 |
| 2,411,287 | Mock | Nov. 19, 1946 |
| 2,440,241 | Armstrong | Apr. 27, 1948 |
| 2,442,399 | Chandler | June 1, 1948 |
| 2,446,469 | Gilbert | Aug. 3, 1948 |
| 2,448,131 | Williams | Aug. 31, 1948 |
| 2,470,098 | Mock | May 17, 1949 |